July 31, 1956   O. J. GERBRACHT   2,757,044
APPARATUS AND METHOD FOR SPRAYING TERRAIN
Filed Sept. 14, 1953   2 Sheets-Sheet 1

INVENTOR
OSCEOLA J. GERBRACHT
BY Williamson, Williamson,
Schroeder & Adams
ATTORNEYS July 31, 1956  O. J. GERBRACHT  2,757,044
APPARATUS AND METHOD FOR SPRAYING TERRAIN
Filed Sept. 14, 1953  2 Sheets-Sheet 2

INVENTOR
OSCEOLA J. GERBRACHT
BY Williamson, Williamson,
Schroeder & Adams
ATTORNEYS United States Patent Office 2,757,044
Patented July 31, 1956

2,757,044
APPARATUS AND METHOD FOR SPRAYING TERRAIN

Osceola J. Gerbracht, Hettinger, N. Dak.

Application September 14, 1953, Serial No. 379,935

6 Claims. (Cl. 299—43)

This invention relates to an apparatus and method for spraying terrain and, more particularly, to the controlled spray treatment of plants growing thereon.

Numerous devices and methods have been proposed for spray treating plants and weeds growing on the ground. There are two main problems which confront the user of such prior equipment. First, where it is desired to vary the amount of spraying liquid to suit the type of plants to be sprayed, no quick and easy method has been devised for accurately changing and controlling the amount of liquid delivered. Secondly, the rate of speed at which the spraying vehicle travels over the ground cannot be held at a constant rate. Consequently, where a predetermined rate of liquid flow is maintained, some portions of the ground will maintain a heavier portion of spraying liquid than others. The problem is further intensified where it is attempted to control the rate of flow through nozzles having pre-set characteristics. For example, if nozzles or spray-heads are designed to deliver a certain quantity of liquid per hour, such quantity should be maintained in order to properly apply the sprayed liquid. The size and direction of the orifices in the spray-heads, the distance separating the spray-heads and the distance from the spray-heads to the ground are all more-or-less fixed with relation to the spraying characteristics of the nozzles. If the rate of flow of liquid is cut down to a fraction of the ideal rate, the amount of ground area covered will be lessened and the concentration of liquid invariably becomes uneven. Thus, where weeds are being treated to selectively kill them while maintaining the healthy growth of desirable plants, such weeds may not receive a sufficient concentration to be effective. On the other hand, those areas receiving too great a concentration will cause not only the weeds to be killed, but also the desirable plants.

It is, therefore, a general object of this invention to overcome the above noted difficulties and to provide an apparatus and method for efficiently and conveniently spraying terrain under conditions which are controllable over a wide range of circumstances.

It is another object of the invention to provide a method and apparatus for delivering a variable but predetermined quantity of active chemical to the terrain and plants growing thereon which will be proportionate to the rate of travel over the ground, all the while preserving the ideal spray characteristics of the nozzle assembly.

It is a further object of the invention to provide an apparatus for delivering a characteristic rate of liquid under constant pressure through pre-set spray-heads, yet varying and controlling the activity of the liquid with respect to its treating power on the terrain and plants growing thereon.

It is a still further object of this invention to provide inexpensive and simple treatment for fertilizing, killing insects, killing weeds and the like which will maintain a high degree of sensitivity and control with a minimum of attention on the part of the operator.

These and other objects and advantages will more fully appear from the following description made in connection with the accompanying drawings wherein like reference characters refer to the same or similar views and in which.

Figure 1:
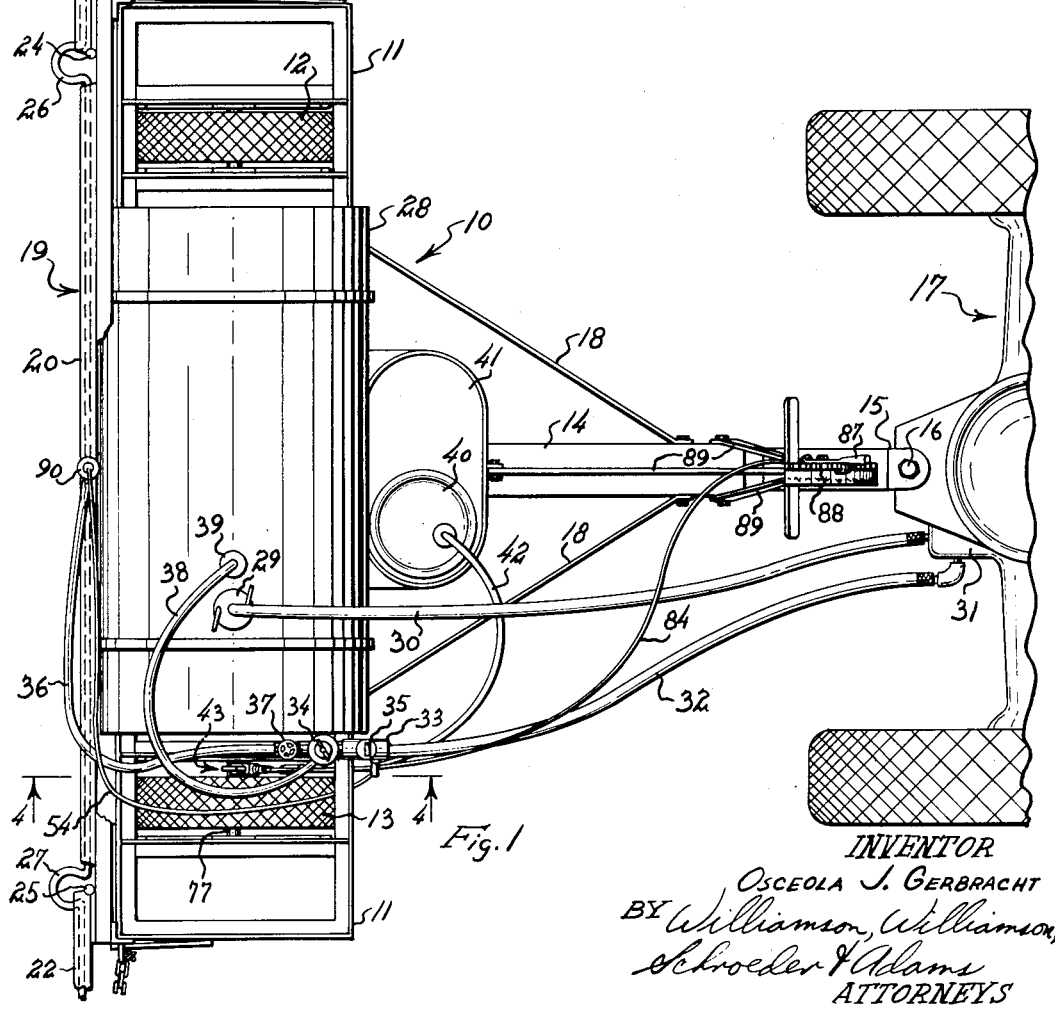
Fig. 1 is a plan view of my spraying vehicle in attached position to a power vehicle such as a tractor, the forward portion of the tractor and portions of the spray vehicle being superfluous and cut away.

Referring now more particularly to the drawings, my device constitutes a spray vehicle which is preferably in the form of a wheeled vehicle 10 as shown in Fig. 1. The wheeled vehicle has a framework 11 to which may be journalled wheels 12 and 13, as shown. A drawbar 14 is rigidly secured to framework 11 and extends forwardly to terminate in a clevis 15 which is adapted to be secured as at pin means 16 to the rear end of a tractor or other vehicle 17, as shown. The wheeled vehicle 10 may be provided with other structures such as braces 18 and has secured at the rear end thereof a spray assembly indicated generally at 19.

The spray assembly constitutes spray arms 20 in the medial rear area of the wheeled vehicle and preferably has, in extensible relation therewith, a pair of side arms 21 and 22. The spray arms 20, 21 and 22 are tubular in nature and constitute a manifold having nozzles or spray-heads 23 secured in liquid communication with the manifold in spaced relation, as shown. The spray-heads are preferably of ordinary construction and are adapted for fixed optimum spraying conditions under a constant pressure head. The space between the nozzles or spray-heads 23 is so constructed as to bring the sprayed areas in abutting relation with very little overlapping. The extendible arms 21 and 22 are hinged at vertical pivot points 24 and 25 respectively and the arms 21 and 22 are respectively connected to the medial arm 20 for fluid communication by flexible couplings 26 and 27 respectively. The arms 21 and 22 can thus be pivotally swung to the rear so as to be out of the way when the wheeled vehicle 10 is transported, for example, along a highway. When in extended position, as shown in Fig. 1, the spray assembly overlies the terrain in spaced clearance and is parallel therewith and transverse to the direction of travel which is longitudinally of the drawbar 14.

Two independent pumping systems are mounted upon the wheeled vehicle 10, one for circulating and delivering carrying fluid such as water and the other for circulating and introducing an active chemical into the spraying assembly.

Figure 2:
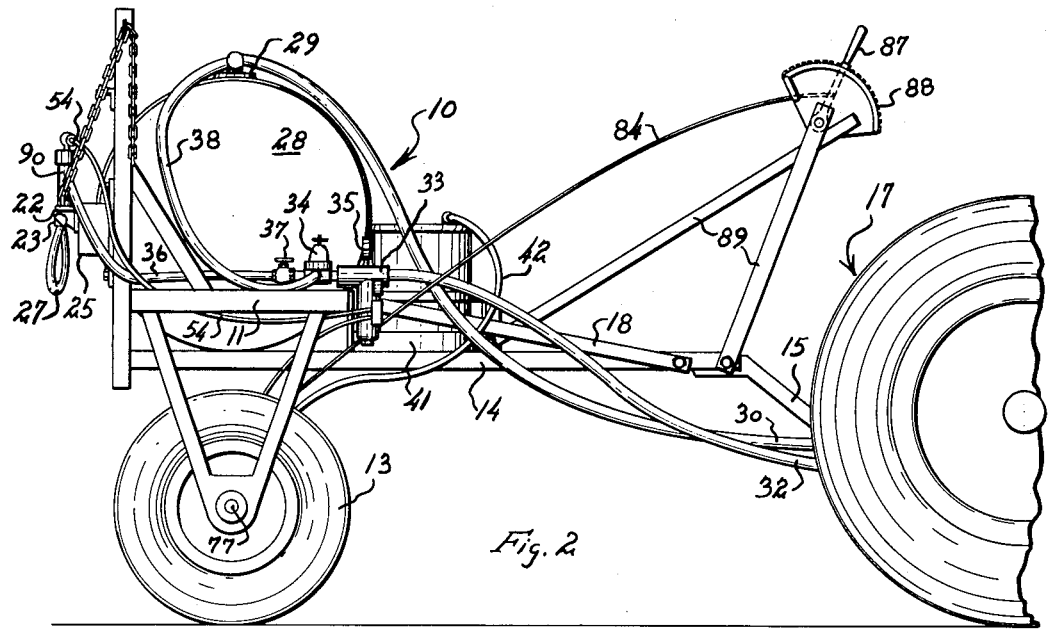
Fig. 2 is a side elevational view of my spray vehicle.

The carrying fluid system has a reservoir or tank 28 mounted on the framework 11, preferably in a lateral position, as shown in Figs. 1 and 2. The reservoir or tank 28 is adapted to hold a carrying fluid such as water and has a capped opening 29 bearing a supply line such as suction tube 30 having an extension communicating with the internal portion of the tank (not shown). The suction tube 30, in turn, extends forwardly to a pumping mechanism 31 which may be driven by a source such as the power take-off of the tractor 17. The outlet of the pump 31 communicates with another portion of the supply line such as the pressure tube 32 which in turn terminates in a strainer member 33. The strainer member 33 communicates, in turn, with a regulating valve 34, and a pressure gauge 35 communicates with the pressure tube 32, the strainer member 33. Further forming a part of the carrying fluid supply line is the tube 36 for delivering carrying fluid under a preselected constant pressure from the regulating valve 34. A shut-off valve 37 may be interposed between the tube 36 and the regulating valve 34 for completely shutting off the line when so desired. The tube 36 communicates with the injecting and mixing portion of the system which, in turn, communicates with the spray assembly 19 and which will be described subsequently in this specification. The regulating valve 34 has an overflow or by-pass tube 38 which leads back to a capped opening 39 communicating in turn with the internal part of tank 28. Thus, when the flow of carrying fluid through the supply system would tend to cause a pressure increase in the tube 36 over and above that controlled by regulator 34, then the additional surplus carrying fluid will be returned to by-pass 38.

It will be noted that the carrying fluid system described thus far will constitute an independent source of fluid under constant pressure which would be delivered at the optimum spraying pressure for the nozzles of the spray assembly. In other words, with the regulator valve 34 properly adjusted, the system thus far described will deliver a uniform and proper spray over the entire area to be traversed during the travel of the wheeled vehicle 10.

The other fluid system comprising an essential part of my invention is the active chemical system which injects the proper amount of treating substance into the spraying liquid under carefully controlled conditions. The chemical system has a tank or reservoir 40 also mounted upon the framework 11 and preferably on a rack 41 securely fixed thereto, as shown in Figs. 1 and 2. Since the proportion of chemical to carrying fluid is quite low, the tank or reservoir 40 need only be a fraction of the size of the tank 28. The small tank 40 has a suction tube 42 communicating with the internal contents thereof, the tube 42 extending downwardly as shown in Fig. 2 and communicating with a pump mechanism indicated generally at 43 as shown in detail in Fig. 4. The pump 43 has a cylindrical barrel 44 which is mounted in fixed relation to the bearing structure 45 of the framework 11, the mounting being accomplished through such means as bracket 46 secured to bearing mount 45 as by bolts 47. The upper portion of barrel 44 is screw-threaded to a valve element 48 having a liquid tight connection 49 with the chemical supply line or tube 42. Interposed between the internal space of the barrel or cylinder 44 and the supply line 42 is a check valve 50 which is preferably in the form of a spring-pressed ball seated on a tapered bearing area 51. The ball check valve 50 will permit the flow of chemical through line 42 and into the internal space of the cylinder or barrel 44 but will not permit the return of fluid through the line. Also communicating with the cylinder of barrel 44 is an outlet passageway 52 which leads through connector 53 into the pressure side of the chemical supply line 54. A similar check valve 55 lies in the outlet passageway 52 and is seated against a tapered bearing area 56. The spring-pressed ball check valve 55 will permit the exit of fluid chemical through the outlet 52 and into the supply line 54 but will prevent the return of the chemical into either the valve 43 or the supply line 42. The delivery or outlet tube 54 of the chemical supply line also communicates with the spray assembly 19 as will be described.

Figure 4:
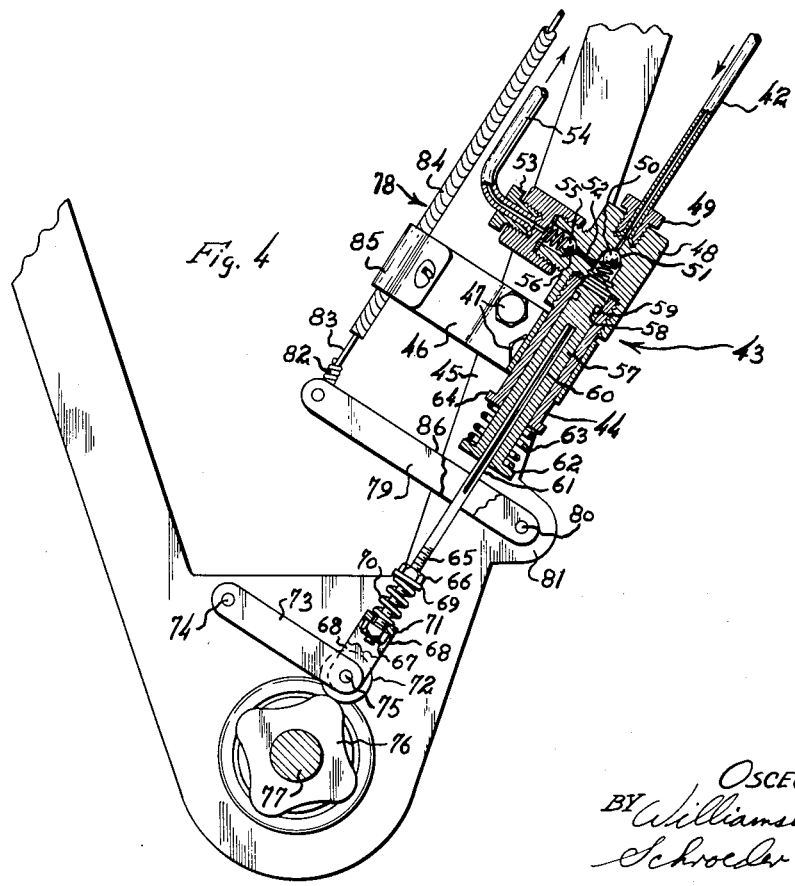
Fig. 4 is an enlarged detailed view of the chemical pumping means, portions thereof being shown in vertical section on a line 4—4 of Fig. 1.

The plunger portion of the pump 43 constitutes a piston 57 which may be supplied with a recessed annular groove 58 for bearing a liquid sealing means such as an O-ring 59. Longitudinally of the piston 57 is a straight bore 60 which slidably receives an actuating piston rod 61 as shown in Fig. 4. The lower portion of piston 57 bears a shouldered extension 62 which retains a compression spring 63 bearing in turn against a lower shoulder 64 formed on the lower peripheral edge of cylinder or barrel 44. The compression spring 63 continually urges the piston 57 downwardly against the abutting action of piston rod 61 within the bore 60. The outward end of the piston rod 61 terminates in a threaded end 65 which bears a pair of nuts 66 and 67 in spaced relation. Slidably receiving the portion of the piston rod 61 lying between the nuts 66 and 67 is a sleeve 68, as shown in Fig. 4. A washer 69 may be positioned against nut 66 and an overload compression spring 70 interposed between the washer 69 and a shoulder portion 71 of the sleeve 68. The sleeve 68 has journalled at its outermost end a cam follower 72, as shown. A radius arm 73 is pivoted to the mounting structure 45 by pivot pin 74 and is pivoted at the other end to the shaft 75 which is co-axial with the cam follower 72. Cam follower 72 rides continuously upon a four-lobe cam 76 which, in turn, is mounted upon the wheel shaft 77 of the wheel 13, in turn journalled to framework 11, as shown in Fig. 1. Compression spring 70 permits the sleeve 68 to oscillate sufficiently to take up any misalignment incurred through the action of radius arm 73 during the turning movement of cam 76.

Means for adjusting the length of stroke of the piston 43 and consequently limiting the delivery quantity of chemical for each stroke of the pump is shown generally at 78. The adjusting means comprises a pivotally mounted stop arm 79 having its point of pivotal attachment 80 secured to an ear 81 formed on the mounting structure 45. The other end of the stop arm 79 has a connection 82 to a control rod 83 which may, in turn, be housed within a flexible cable 84 mounted at 85 to the mounting bracket 46 as shown. The upper surface 86 of stop arm 79 is adapted to engage the shouldered portion 62 of the piston 57 as will be described under the operation of the device. Adjusting rod 83 communicates at its upper end with a manually operable lever 87 which will extend or retract the arm 79 in a preselected manner to adjust the radial position thereof with respect to the pivotal point 80. A dial or indicating gauge 88 may be provided in connection with the manual adjusting handle 87 so as to visibly indicate the positioning of stop arm 79 and to gauge the quantity delivery of liquid chemical. Braces or brackets 89 may be attached to framework 11 for support of the manual adjusting and gauging mechanism as shown in Fig. 2.

Figure 3:
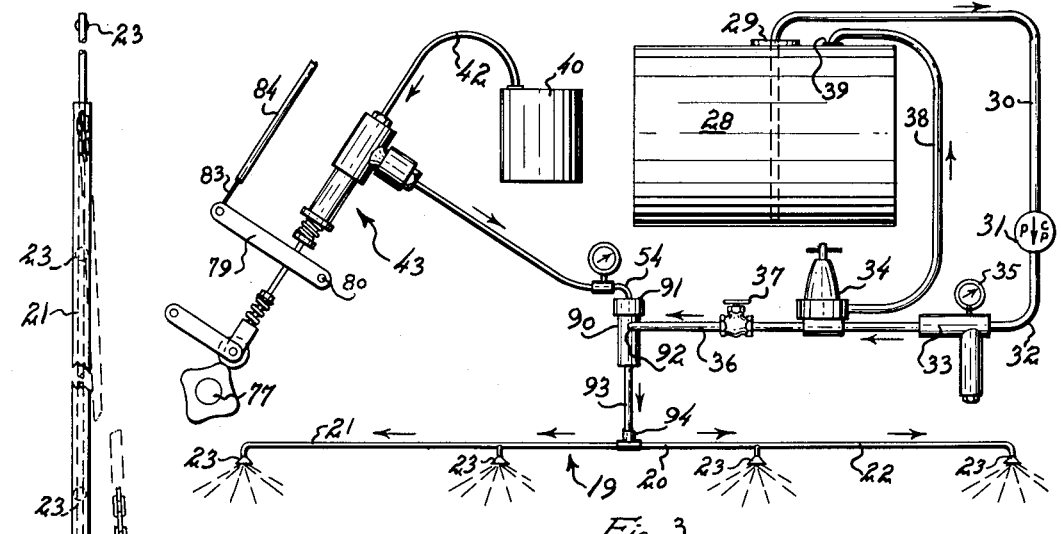
Fig. 3 is a diagrammatic representation of the spraying reservoirs and mechanism.

Referring now to Figs. 1 and 3, the carrying fluid line 36 and the chemical line 54 both terminate in a mixing chamber 90 which is mounted upon and in communication with the spray assembly 19 as previously noted and as observed from Fig. 3. The upper end of the mixing chamber 90 bears a cap 91 through which the chemical supply tube 54 communicates in liquid-tight relation. The carrying fluid line 36 is preferably introduced tangentially at 92 for creating a whirling mixing action within the mixing chamber 90 as is common in the art. The product outlet from the mixing chamber 90 communicates through connecting tube 93, which in turn leads into the T-member 94. Each of the lateral openings of the T-member 94 are secured in liquid communication with the arms of the spray assembly 19 which, in its diagrammatic form, does not show all of the spray-heads nor the complete hinged arm assembly.

In my method or procedure of spraying and in the use and operation of my apparatus, the reservoir 28 is filled with a carrying fluid, preferably water, and the smaller reservoir 40 is supplied with suitable fluid chemical such as that employed in killing weeds preferentially in the presence of useful plants. The pump 31 is energized so as to continuously pump water from tank 28 through the strainer 33 and into the regulating valve 34. The water pressure supplied through the line 36 may be adjustably fixed so that it will be delivered at a continuous and uniform rate through spray-heads 23, as previously pointed out, the overflow or excess water being recirculated through the by-pass line 38 back to reservoir 28.

When the power vehicle 17 is set in forward motion, the cam element 76 will turn with wheel shaft 77 in response to the rotation of wheel 13 over the ground. With the particular cam shown, the four lobes will cause four reciprocations of piston 57 for every turn of the wheel 13. At each reciprocation or stroke, the piston 57 will suck in a quantity of chemical through line 42 and past the check valve 51. The suction or downward stroke of the piston 57 is accomplished through the action of compression spring 63. When, however, the shoulder portion 62 of the piston 57 abuts against the upper surface 86 of stop arm 79, the downward travel of the piston 57 will be stopped. The piston rod 61, however, will continue downwardly as the cam follower 72 rides on the lobes of cam 76. As the cam follower 72 begins to climb upon the next cam lobe, the piston rod 61 will reciprocate in the opposite direction and again abut against the upper end of opening 60 in the piston 57. The piston 57 will then begin its upward travel, forcing fluid chemical from the piston chamber through the outlet 52 and into the chemical supply line 54 from which it enters the mixing chamber 90 and becomes intimately injected and intermixed with the water from the supply line 36. It will be noted that the quantity of chemical fluid will be constant for any given number of rotations of the wheel 13 at any given setting of the stop arm 79. Thus a fixed and controlled quantity of chemical will be delivered per unit area of terrain traveled over by the wheeled vehicle regardless of the speed at which the vehicle travels. This is in contradistinction to the rate of supply of carrying fluid which remains constant regardless of whether the wheeled vehicle is travelling at a high or low rate of speed or is travelling at all, for that matter. The quantity of carrying fluid or water supplied to the spray assembly is such as will give an optimum spray over the width of the assembly. This quantity should not be such as will drip or run off plants sprayed in the normal course of events. I have found that a good average rate of application of water to the spray assembly is six or seven gallons per acre traversed. I may achieve good results with as low a quantity as five gallons per acre and as high as ten gallons per acre with the particular equipment built. With respect to the chemical where ordinary weed killing liquids are employed, I may inject, for example, from one-third to one-half a pint per acre of terrain. Since plants such as flax and corn have a tolerance range which will not withstand quantities of certain weed killing chemicals in excess of one-half a pint per acre, more than that quantity will kill the corn or flax while less than one-third of a pint per acre will not be effective in killing weeds. The above specific additions apply only to one type of fluid chemical which may be usefully employed in my apparatus. Chemicals of different types and for different purposes may require adjustments whereby greater or lesser quantities of chemical per acre be delivered. In any event, the remarkable sensitivity and control of my equipment makes possible the safe and sure application of these potent chemicals while, at the same time, obtaining maximum effectiveness from the treatment.

In adjusting the stop arm 79, the backward stroke of piston 57 can be increased by lowering the arm from its position shown in Fig. 4. On the upward stroke, the quantity of chemical in the chamber delivered through the outlet 52 will thus be increased. It will be noted that the new setting of stop arm 79 will effect a delivery of new quantity of chemical per acre sprayed regardless of the speed of forward travel. The entire injection of chemical is thus automatically compensated for merely by selecting the indicated quantity of chemical which it is desired to spray per acre of terrain. The amount of chemical injected into the mixing chamber 90 is such as will not substantially affect the spraying characteristics of the spray assembly. Thus, for example, where seven gallons of water per acre is the amount of carrying fluid delivered through the spray-heads, adding a differential of several pints per acre to the quantity of carrying fluid will not materially alter the pattern of spray or the uniformity of application.

It may be further mentioned that, because my mixing chamber is in close association with the spray assembly, I can effect almost instantaneous changes in concentration within the mixed liquid which is sprayed from the nozzles. The latter is important when patches of weeds are encountered which may be of a different and hardier variety than the general run within the area to be sprayed. Thus, with the relation of the concentration required to kill a patch of difficult weeds, I can change the concentration at that particular point and again lower the concentration when the difficult area has been passed.

My method of spraying can be usefully employed in the art of spraying plants to kill blight and bugs or may even be employed to disseminate liquid fertilizer to the ground itself. In all events, my control over the concentration of sprayed fluid is of extremely high quality which makes for efficient results at lower operating cost.

It will, of course, be understood that various changes may be made in the form, detail, arrangement and proportion of the parts without departing from the scope of my invention which consists of the matter disclosed herein and set forth in the appended claims.

What is claimed is:

1. A machine for travelling over the terrain and spraying plants growing thereon comprising, a supply line for delivering carrying fluid, spaced nozzles for overlying the terrain during operation of the machine, means for supplying carrying fluid under substantially constant pressure from said supply line to said nozzles to deliver the carrying fluid at a substantially continuous and controlled manner through said nozzles, a supply line for providing a quantity of active chemical, a pump for injecting relatively small controlled quantities of chemical from said chemical supply line to the carrying fluid supply line, and means for preselecting a relatively small quantity of chemical to be injected for a given area of terrain, said pump being automatically compensated for the rate of travel of said machine so as to maintain the amount of chemical delivered to said given area at a substantially constant value.

2. A machine for travelling over the terrain and spraying plants growing thereon comprising, a wheeled vehicle, a reservoir for water, a spray assembly in spaced clearance with the terrain, means for supplying water under substantially constant pressure from said reservoir to the spray assembly to deliver water at a substantially continuous and controlled manner through the spray assembly, a reservoir for active chemical liquid mounted on said vehicle, means responsive to the travel of said machine over the terrain to deliver a relatively small amount of chemical proportionate to the rate of travel into a portion of said water supply, and means for maintaining a constant and even flow of liquid through said spray assembly whereby to maintain a substantially even and constant rate of flow of the total liquid, yet controlling the quantity of active chemical liquid per unit area of terrain.

3. A method of chemically treating large areas of terrain which consists in pressurizing water to a constant predetermined value, delivering said pressurized water to a spray assembly and causing it to be sprayed uniformly therethrough while moving said spray assembly over the terrain in a prescribed path, simultaneously injecting and mixing with said water in proportion to the rate of travel over the terrain a continuous quantity of chemical for spraying therewith, said quantity of chemical being of such low ratio with respect to the quantity of water as will not materially affect the uniformity of spray.

4. A method of chemically treating large areas of terrain which consists in spraying uniformly a substantial quantity of water at a fixed rate through a spray assembly, independently moving said spray assembly over the terrain in a prescribed path, simultaneously injecting and mixing proportionately to the rate of movement over the terrain a quantity of fluid chemical into said water for spraying therewith, adjustably controlling the quantity of fluid chemical for any given rate of travel without disturbing said proportionate injecting and mixing, said quantity of chemical being of such low ratio with respect to the quantity of carrying fluid as will not materially affect the uniformity of spray.

5. A machine for traveling over the terrain and spraying plants growing thereon comprising, a supply line for delivering carrying fluid, a plurality of nozzles having fixed orifice structure and fixed relative positions during operation of the machine in its travel over the terrain, said plurality of nozzles each having fluid connection with said supply line, means interposed in said supply line maintaining said carrying fluid under substantially constant pressure to deliver the carrying fluid to the terrain at a substantially continuous and controlled manner through said nozzles, a chemical supply line in fluid connection with said carrying fluid supply line, and a pump interposed in said chemical supply line driven by and at a rate proportionate to the rate of travel of the machine for injecting relatively small controlled quantities of said chemical from the chemical supply line into the carrying fluid.

6. A method of chemically treating with spray nozzle equipment large areas of terrain which consists in uniformly spraying under constant pressure a substantially fixed quantity of carrying fluid per unit of time, independently moving the nozzle equipment over the terrain in a prescribed path, and simultaneously injecting and mixing chemical into said carrying fluid at a fixed quantity per unit of terrain area and in low quantity ratio so as to preserve substantially the uniformity of spray irrespective of the rate of injection of the chemical.

References Cited in the file of this patent
UNITED STATES PATENTS

| | | |
|---|---|---|
| 2,222,598 | Arnold | Nov. 26, 1940 |
| 2,657,091 | Quarles | Oct. 27, 1953 |